(12) United States Patent
Sage

(10) Patent No.: US 8,690,216 B2
(45) Date of Patent: Apr. 8, 2014

(54) VEHICLE SECURITY PARTITION

(71) Applicant: Stuart Sage, Rogers, AR (US)

(72) Inventor: Stuart Sage, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 0 days.

(21) Appl. No.: 13/650,806

(22) Filed: Oct. 12, 2012

(65) Prior Publication Data

US 2013/0113232 A1 May 9, 2013

Related U.S. Application Data

(60) Provisional application No. 61/628,697, filed on Nov. 4, 2011.

(51) Int. Cl.
*B60R 21/12* (2006.01)

(52) U.S. Cl.
USPC ...................................... 296/24.42

(58) Field of Classification Search
USPC ......... 296/24.4, 24.42, 24.43, 24.46; 280/749
See application file for complete search history.

(56) References Cited

U.S. PATENT DOCUMENTS

| 4,015,875 | A | 4/1977 | Setina |
| 4,035,014 | A | 7/1977 | Sellers |
| 4,173,369 | A | 11/1979 | Roggin |
| 4,595,227 | A | 6/1986 | Setina |
| 4,964,666 | A | 10/1990 | Dillon |
| 5,246,261 | A * | 9/1993 | McCormack ............... 296/24.34 |
| 5,511,842 | A | 4/1996 | Dillon |
| 5,536,057 | A | 7/1996 | Stewart |
| 6,669,259 | B2 | 12/2003 | Murray et al. |
| 6,827,382 | B2 | 12/2004 | Murray et al. |
| 6,983,969 | B2 | 1/2006 | Murray et al. |
| 7,195,297 | B2 | 3/2007 | Murray et al. |
| 7,380,853 | B2 | 6/2008 | Wells |
| 7,493,844 | B2 | 2/2009 | Martin |
| 7,717,484 | B2 | 5/2010 | Parle et al. |
| 7,726,688 | B2 | 6/2010 | Setina |
| 7,806,452 | B2 | 10/2010 | Storer et al. |
| 2013/0147221 | A1 * | 6/2013 | Setina ......................... 296/24.42 |

* cited by examiner

*Primary Examiner* — H Gutman
(74) *Attorney, Agent, or Firm* — Boyd D. Cox

(57) ABSTRACT

The vehicle security partition has a barrier that separates the interior compartment of an automotive vehicle into front and rear seating areas in order to inhibit contact between front seating area occupants and rear seating area occupants. A bi-directional recessed housing is part of the barrier which is supported by a frame and provides legroom for the rear seating area occupant while allowing for full rearward adjustment of the driver's seat. The bi-directional recessed housing also includes a recessed area for storing articles in the front seating area.

24 Claims, 6 Drawing Sheets

VEHICLE SECURITY PARTITION

Priority for this application is claimed from U.S. Provisional Application No. 61/628,697 entitled "Vehicle Security Partition" filed on Nov. 4, 2011

BACKGROUND

The present invention is directed to a vehicle security partition for an automotive vehicle in which the partition has a bi-directional recessed housing that allows the driver seat to be fully adjustable, while also providing leg room enough to allow a passenger in the rear seating area to sit upright with feet on the vehicle floorboard.

In law enforcement situations, it is often necessary for apprehended individuals or prisoners to be transported from one location to another. Typically for transport, the apprehended individual or prisoner is placed in the rear passenger seat of the law enforcement vehicle. To safely confine a person in the rear seat and to protect front seat occupants in the vehicle, security partitions have been devised which separate the rear seating area from the front seating area. Such partitions generally protect the front seat occupants from any disruptive behavior created by the individual riding in the rear passenger seat and securely hold the individual in the vehicle's rear passenger compartment to inhibit escape.

Such barriers are typically retrofitted into standard vehicle models that are used by law enforcement as police cars. Many vehicles that are currently used for law enforcement have a small amount of space in the rear seating area making it difficult for a rear seat passenger to sit comfortably and rest their feet on the floorboard of the vehicle. When additional electronic equipment is added to a law enforcement vehicle, the amount of available space in the interior compartment decreases. Also, with a security partition installed in a vehicle, the available leg room decreases even more, making it difficult for a prisoner housed in the rear seating area to sit comfortably and position his or her feet on the floorboard.

Additionally, prior art partitions can adversely affect the adjustability of the driver seat by reducing the distance that the seat can be adjusted in the backward direction. With adjustability of the driver seat compromised, a taller driver can experience the lack of adequate leg room to safely and comfortably operate the vehicle.

The present invention is drawn to a vehicle security partition having a bi-directional recessed housing that comprises part of the lower section of the partition's barrier. The bi-directional recessed housing makes full use of the space in the vehicle's interior compartment, which allows the driver seat to adjust to the full back position, provides an expanded leg room area in the rear seating area and provides a secure area for storing equipment.

SUMMARY

The vehicle security partition of the present invention is a dividing wall that can be installed in the interior compartment of a vehicle in order to separate the front seating area from the rear searing area. The dividing wall has a bi-directional recessed housing disposed on a lower section thereof. The bi-directional recessed housing has a first recessed area on the passenger side of the rear seating area to accommodate an occupant's legs, allowing his or her feet to rest on the floorboard and a second recessed area that provides a secure space for equipment storage in the front seating area. The vehicle security partition also allows for full forward and rearward adjustment of the driver seat.

It is an object of the present invention to provide a security partition with a bi-directional recessed housing that provides leg room in the rear seating area and allows for full adjustment of the driver seat.

It is a further object of the present invention to provide a bi-directional recessed housing on a security partition for an automotive vehicle to fully utilize the interior space of the vehicle interior compartment.

It is a further object of the present invention to provide a partition that effectively isolates front seat occupants from rear seat occupants while allowing full adjustment of the driver seat.

It is a further object of the present invention to provide a dividing wall for a vehicle that separates the rear seating area from the front seating area and allows adequate leg room in order that a rear passenger can place both feet on the floorboard.

It is a further object of the present invention to provide a vehicle security partition that allows for full rearward adjustment of the driver seat, that provides enough leg room for the rear passenger to place both feet on the floorboard and that provides a storage area that is accessible to front seat occupants.

It is a further object of the present invention to provide a barrier for the interior of a vehicle that isolates the occupants of the front seating area from those occupants in the rear seating area.

It is a further object of the present invention to provide a partition for an automotive vehicle that does not interfere with the adjustment of the driver seat.

It is a further object of the present invention to provide a security partition that can be easily installed into an existing automotive vehicle.

It is a further object of the present invention to provide a bi-directional recessed housing having first and second recessed areas that open in opposite directions.

It is a further object of the present invention to provide a bi-directional recessed housing having a first recessed area that is forward of the second recessed area.

It is a further object of the present invention to provide a bi-directional recessed housing that can be retrofitted into a security partition.

BRIEF DESCRIPTION OF THE DRAWINGS

Reference is made to the accompanying drawings in which are shown illustrative embodiments of the invention and from which novel features and advantages will be apparent.

DETAILED DESCRIPTION

Figure 1:
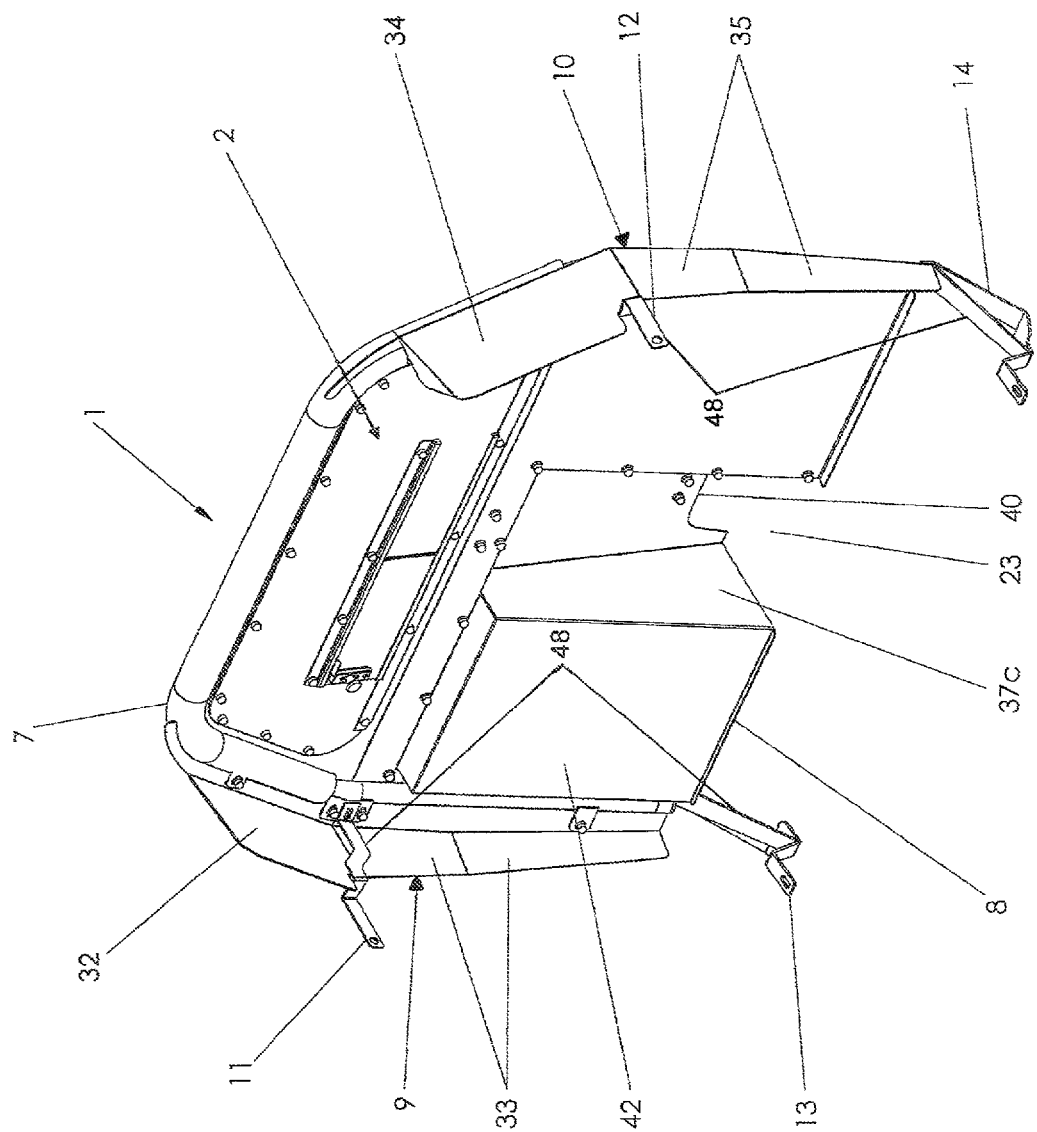
FIG. 1 is a front perspective view of a preferred embodiment of the vehicle security partition of the present invention.
Figure 2:
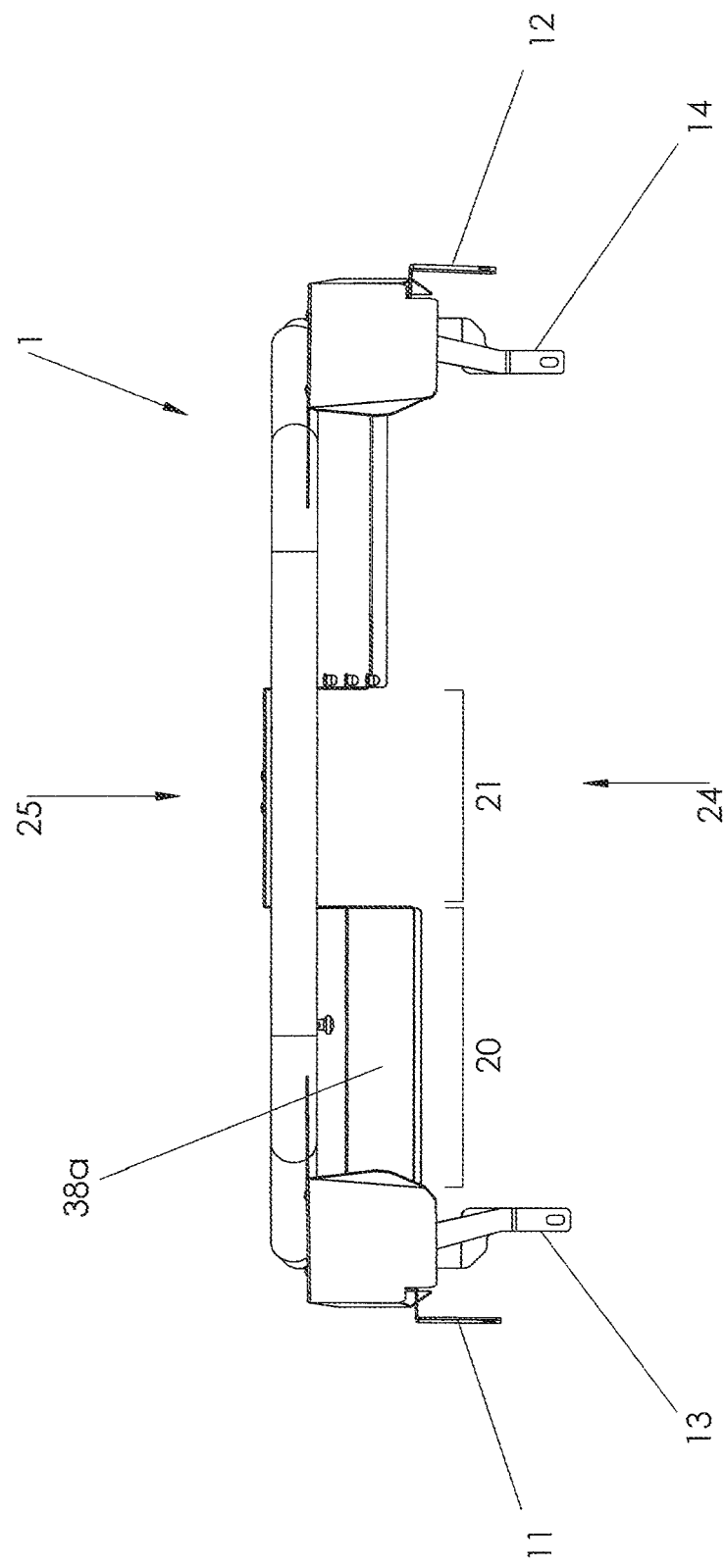
FIG. 2 is a top planar view of the vehicle security partition of FIG. 1.
Figure 3:
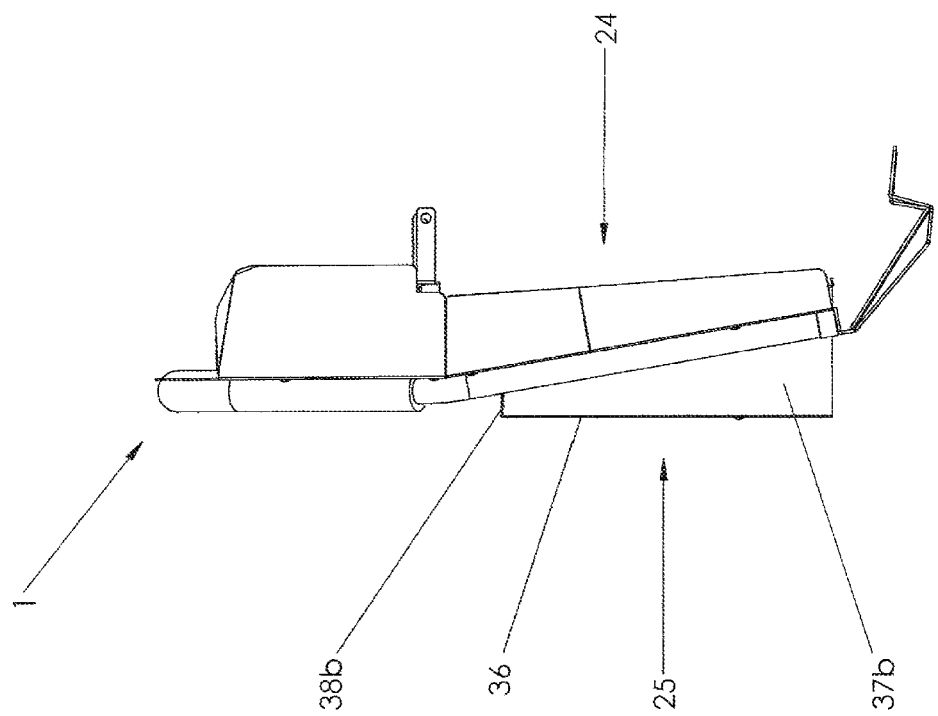
FIG. 3 is a side planar view of the vehicle security partition of FIG. 1.

Referring to FIGS. 1-4, there is shown the vehicle security partition (1) of a preferred embodiment of the present invention adapted for installation in an automotive vehicle. The security partition (1) includes a barrier (2), a frame (3) and means for securing the vehicle security partition to an automotive vehicle. When installed in an automotive vehicle, the vehicle security partition (1) divides the vehicle's interior compartment between the front and rear seating areas and physically separates any occupants in the front seating area from any occupants in the rear seating area. A forward side (24) of the barrier (2) is directed toward the front seating area and a rearward side (25) is directed toward the rear seating area of the vehicle.

Supporting the barrier (2), the frame (3) includes a passenger side member (4), a driver side member (5) and a top cross member (6). The top cross member (6) extends between the passenger side member (4) and the driver side member (5) to form a general "U" shape.

Figure 5:
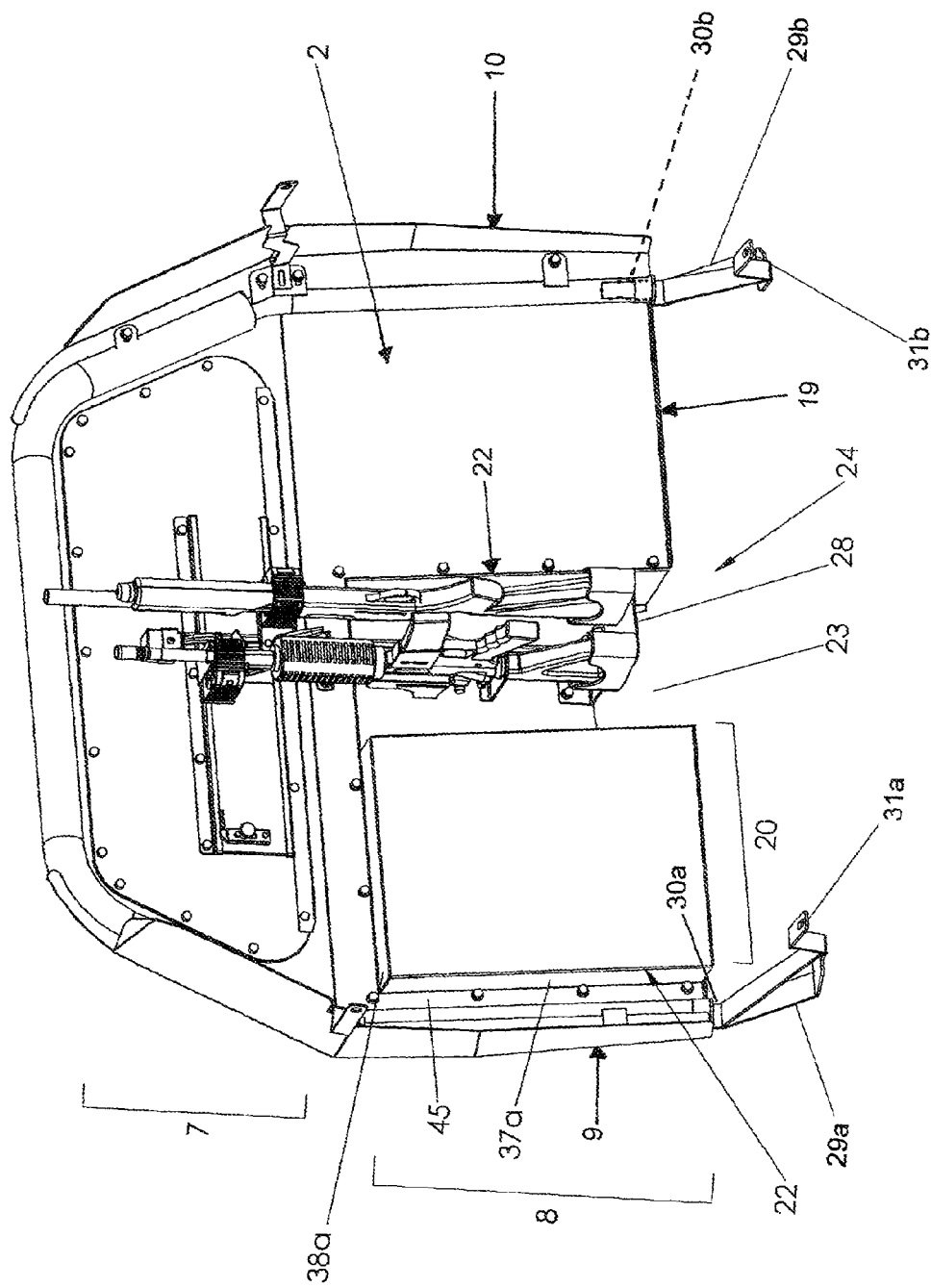
FIG. 5 is a front perspective view of another preferred embodiment of the vehicle security partition showing a gun mount disposed in the second recessed area.

The barrier (2) is a dividing wall having an upper section (7), a lower section (8) and a plurality of side panels which includes a passenger side panel (9) and a driver side panel (10) as shown in FIGS. 1 and 5. Upper (32) and lower (33) passenger side wings form the passenger side panel (9). Similarly, the driver side panel (10) is comprised of upper (34) and lower (35) driver side wings.

The means for securing the vehicle security partition to an automotive vehicle is a plurality of support brackets (48) which induces a passenger side upper bracket (11), a driver side upper bracket (12), a passenger side floor bracket (13) and a driver side floor bracket (14).

Figure 4:
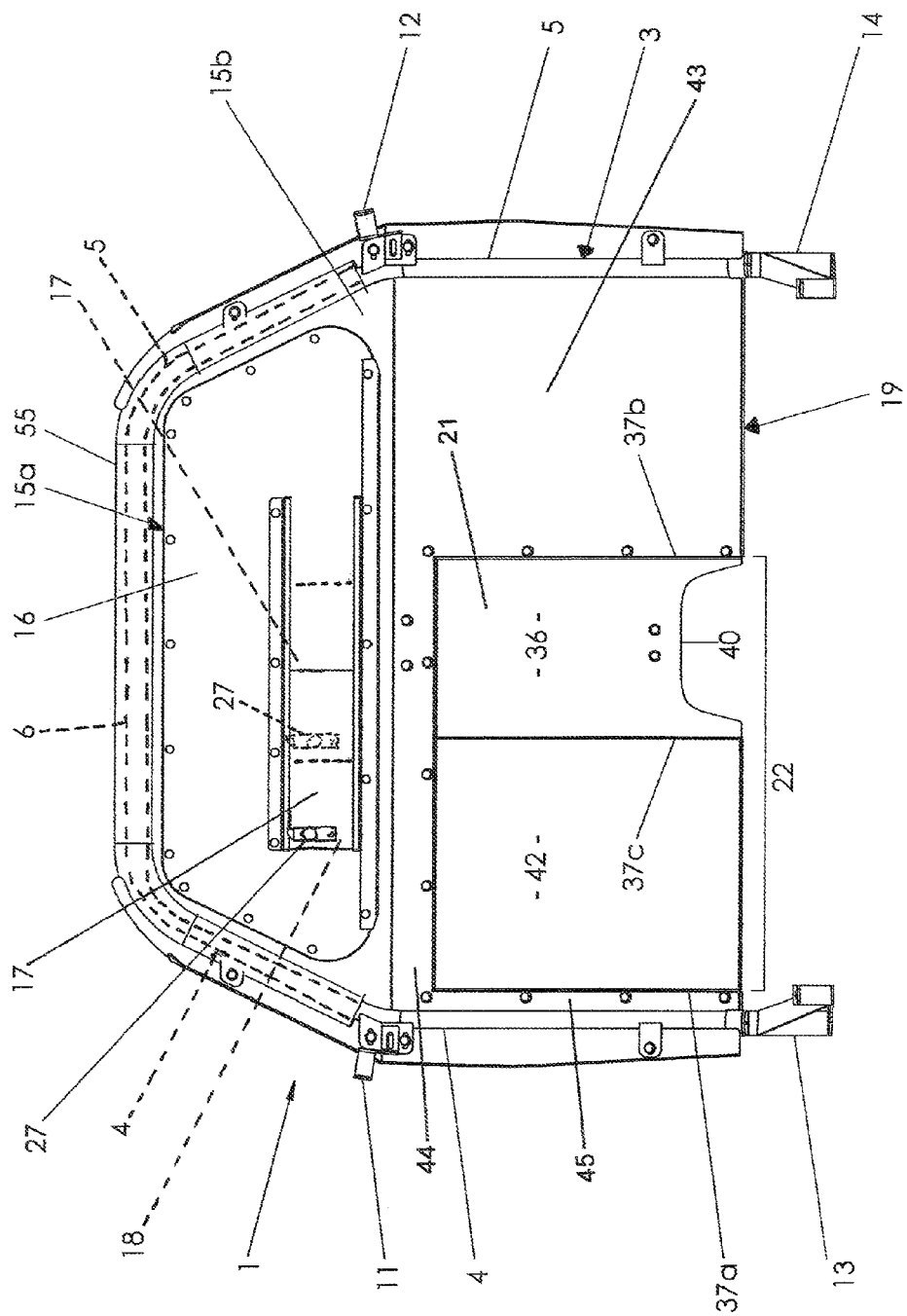
FIG. 4 is a front planar view of the vehicle security partition of FIG. 1.

The upper section (7) of the barrier (2) shown in FIGS. 1 and 4 comprises a window (15a) and window support (15b). Preferably, the window (15a) comprises a fixed panel (16) and a moveable panel (17). The window (15a) also includes an access opening (18) therethrough. A lock (27) comprised by the window (15a) can be selectively engaged to secure the moveable panel (17) against sliding relative to the fixed panel (16).

Figure 6:
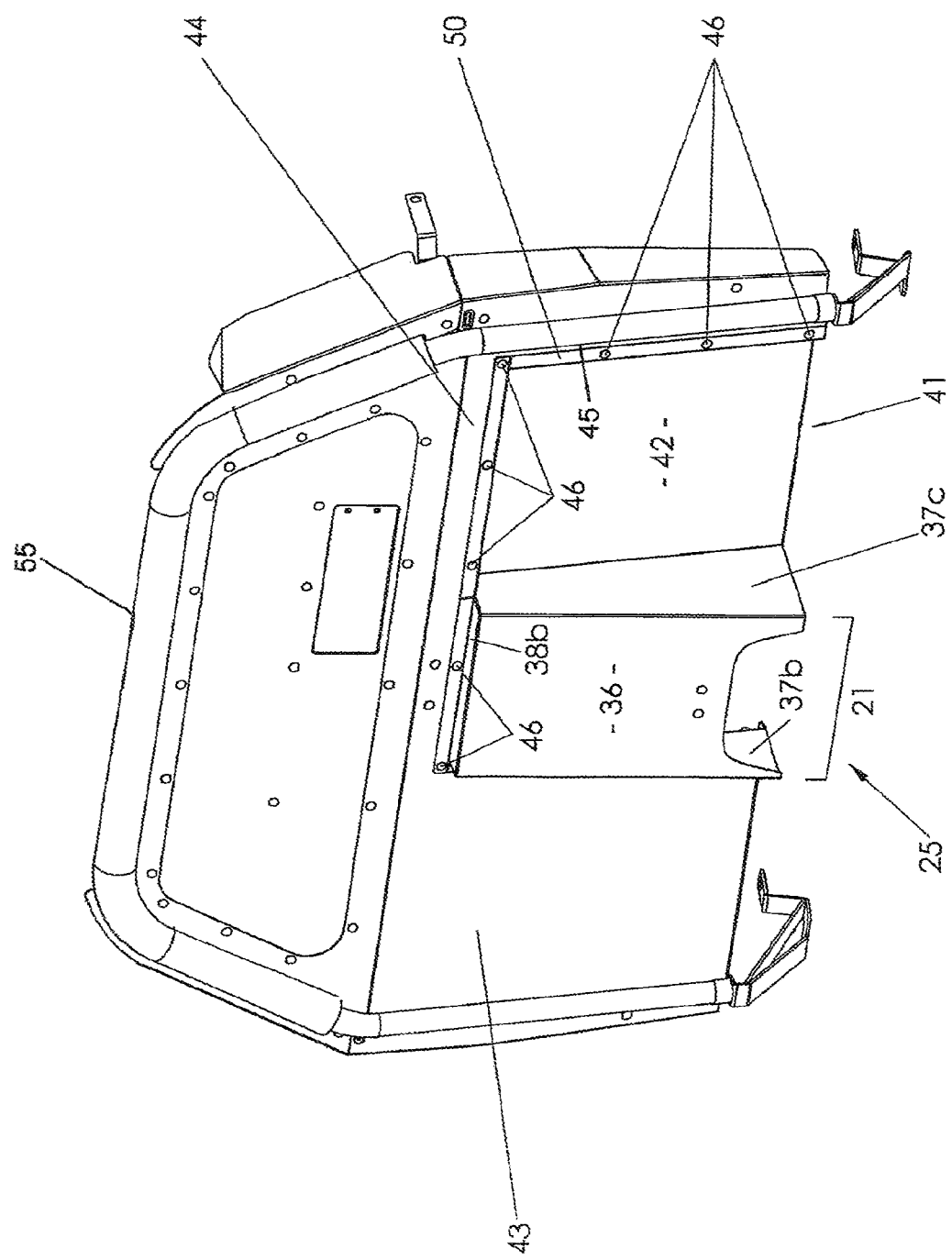
FIG. 6 is a rear perspective view of the vehicle security partition of FIG. 5.

Referring to FIGS. 4-6, the lower section (8) of the barrier (2) includes a bi-directional recessed housing (22), a housing support (19) and means for attaching the housing to the housing support. The bi-directional recessed housing (22) has a passenger side section (20) and a central section (21). The central section (21) includes a contour cutout (40) that at least partially conforms to a general shape of the vehicle's floorboard. The passenger side section (20) comprises a first recessed area (41) and the central section (21) comprises a second recessed area (23). The housing (22) also comprises a flange (50) which is disposed along the top and sides of the housing (22). The housing support (19) has a driver side support (43), a cross support (44) and a strut support (45). Preferably, the means for attaching the housing (22) to the housing support (19) comprise a plurality of fasteners (46) which secure the flange (50) to the housing support (12). The attachment means may comprise items such as bolts, rivets, screws, pins, welds and adhesives. It is also noted that, if desired, the flange (50) can be eliminated and the housing (22) attached to the housing support (19) by welding or other suitable means.

The frame (3) is preferably tubular and has a generally U-shaped form, wherein the passenger side member (4) and the driver side member (5) extend generally parallel to each other for at least a portion of their length and form the two extending legs of the "U". The top cross member (6) extends between the passenger (4) and driver (5) side members, thereby connecting the side members (4, 5) and forming the base of the "U". A safety cushion (55) is disposed around a portion of the frame (3).

In a preferred embodiment of the present invention, the first recessed area (41) is characterized by a front wall (42), a passenger side wall (37a), a shared wall (37c) and a passenger top wall (36a). The second recessed area (23) is defined by a back wall (36), a central side wall (37b), a central top wall (38b) and the shared wall (37c). The front wall (42) and passenger top wall (38a) of the first recessed area (41) are generally rectangularly shaped, while the passenger side wall (37a) and shared wall (37c) are generally trapezoidal. Similarly, in the second recessed area (23), the central top wall (38b) and the back wall (36) are generally rectangular, while the central side wall (37b) and the shared wall (37c), as previously stated, are generally trapezoidally shaped. The front wall (42), back wall (36), top (38a,38b) and side (37a, 37b, 37c) walls define the shape of the first (41) and second (23) recessed areas of the bi-directional recessed housing (22).

The first recessed area (41) opens toward the rearward side (25) of the barrier (2) and the second recessed area (23) opens toward the forward side (24) of the barrier (2) so that the respective recessed areas (41, 23) can be accessed from opposite sides of the bi-directional housing (22). Hence, the first recessed area (41) is accessible from the rearward side (25) of the partition (1) and the second recessed area (23) is accessible from the forward side (24).

In a preferred embodiment, the window (15a) and the upper passenger (32) and upper driver (34) side wings are made of a transparent polycarbonate. The window support (15b), as well as the lower section (8), including the housing support (19) and the bi-directional recessed housing (22) are made of metal. In addition, the lower passenger (33) and lower driver (35) side wings are preferably made of metal. Although these are the preferred materials, these elements could be made all of polycarbonate, all of metal or other desired combinations thereof. Also, other suitable materials could be used instead, including, but not limited to, high impact plastic, fiberglass or composites.

The plurality of support brackets (11, 12, 13, 14) secures the partition (1) within the vehicle. Specifically, the passenger (13) and driver (14) side floor brackets secure the partition (1) to the floorboard of the automotive vehicle on the respective passenger and driver sides of the vehicle, while the passenger (11) and driver (12) side upper brackets secure the partition (1) to the respective passenger and driver sides of the automotive vehicle.

Both the passenger (11) and driver (12) side upper brackets are mounted on the frame (3). Specifically, the passenger side upper bracket (11) is attached to the passenger side member (4) of the frame (3) and the driver side upper bracket (12) is attached to the driver side member (5). Consequently, the driver side upper bracket (12) secures the frame's driver side member (5) to the driver side of the vehicle, while the passenger side upper bracket (11) attaches the frame's passenger side member (4) to the passenger side of the vehicle.

On the bi-directional recessed housing (22), the first recessed area (41) provides a space in the rear seating area of the vehicle. The space is disposed between the vehicle's rear seat and the front wall (42) of the first recessed area (41) and provides leg room directly behind the front passenger seating area for a passenger in the rear seating area. The second recessed area (23) provides a space on the forward side (24) of the barrier (2) in the front seating area. This space in the second recessed area (23) provides for the storage of various items, including guns, electronic equipment and flashlights.

The size of the frame (3) and barrier (2) generally conforms to the dimensions of the vehicle's interior compartment. Respectively attached to the passenger side member (4) and driver side member (5) are the passenger side panel (9) and the driver side panel (10). The passenger (9) and driver (10)

side panels extend outwardly from the frame (3) and toward the interior walls of the vehicle. The side panels (9, 10) function to fill the gaps or space between the frame (3) and the vehicle's interior walls, adding further security. The side panels (9, 10) extend outwardly from the passenger (4) and driver (5) side members of the frame (3) as shown in FIGS. 1 and 4. The passenger side panel (9) includes upper (32) and lower (33) passenger side wings. Similarly, the driver side panel (10) comprises upper (34) and lower (35) driver side wings.

As shown in FIGS. 4-6, the bi-directional recessed housing (22) is mounted to the housing support (19) by the fasteners (46) which extend along a portion of the housing's perimeter. The housing support (19) partially surrounds and supports the bi-directional recessed housing (22), with each of the driver side support (43), the cross support (44) and the strut support (45) extending along a respective portion of the housing (22).

In the preferred embodiment of the present invention shown in FIG. 4, the window (15a) of the upper section (7) of the barrier (2) is characterized by an open position and a closed position. In the open position, shown by dotted lines, the moveable panel (17) is shifted away from the access opening (18) and the access opening (18) is at least partially unobstructed, thereby allowing communication between the forward (24) and rearward (25) sides of the barrier (2). In the closed position, the moveable panel (17) covers the access opening (18), thereby inhibiting communication between the two sides (24, 25) of the barrier (2).

For security purposes when the window (15a) is in the closed position, accessibility to the lock (27) is limited to users on the barrier's forward side (24), particularly, vehicle occupants in the front seating area. Consequently, the moveable panel (17) of the window (15a) can only be locked and unlocked by an occupant of the front seating area.

In other preferred embodiments of the present invention, the size of the moveable panel of the window can be variable. The moveable panel can comprise up to approximately half the window's size. In such preferred embodiments, the size of the access opening can also comprise up no half the size of the upper section. Also, the window can include a moveable panel and two fixed panels, wherein the moveable panel is flanked by the fixed panels. In each of these other preferred embodiments, the panels comprise a transparent polycarbonate. If desired, wire mesh can be embedded in any selected panel or panels for added security.

In the preferred embodiments of the present invention shown in FIGS. 1-6, the passenger (13) and driver (14) side floor brackets each comprise a respective stanchion (29a, 29b), a protrusion (30a, 30b) and a floor mounting tab (31a, 31b). When the vehicle security partition (1) is installed, the stanchions (29a, 29b) rest on the floorboard of the automotive vehicle. The floor mounting tabs (31a, 31b) are attached to the floorboard, preferably by means of a pre-existing bolt, such as a bolt holding a front seat in place. A lower end of the passenger side member (4) of the tubular frame (3) fits over the protrusion (30a) of the passenger side floor bracket (13). Similarly, the driver side member (5) is fitted over the protrusion (30b) of the driver side floor bracket (14). Consequently, the frame (3) is held in position within the vehicle by the upper brackets (11, 12), discussed previously and the floor brackets (13, 14). With the barrier (2) secured to the frame (3), the vehicle security partition (1) can be securely mounted within the vehicle.

On the lower section (8) of the barrier (2), the second recessed area (23) of the central section (21) is adjacent to the first recessed area (41) of the passenger side section (20). The back wall (36) of the second recessed area (23) is disposed rearwardly of the front wall (42) of the first recessed area (41). Conversely, the front wall (42) in the passenger section (20) is positioned forwardly of the back wall (36) in the central section (21) of the bi-directional recessed housing (22). The first recessed area (41) is open to the rearward side (25) of the barrier (2) and the second recessed area (23) is open to the forward side (24) of the barrier (2). Consequently, the second recessed area (23) is accessible from the front seating area of the vehicle and the first recessed area (41) is accessible from the rear seating area.

When the security partition (1) is installed, the barrier (2) is positioned rearwardly of the driver and front passenger seats in the vehicle. The housing support (19) is disposed in the rear leg room area on the driver side of the vehicle thereby decreasing the leg room of the rear passenger area on that side. This positioning of the partition (1) provides sufficient room on the forward side (24) of the housing support (19) on the driver's side of the vehicle to allow for full adjustment of the driver seat.

On the passenger side section (20) of the barrier (2), the front wall (42) and at least a portion of the first recessed area (41) are disposed in a more forward position within the vehicle than the housing support (19). This arrangement provides more leg room in the rear passenger area on the passenger side of the vehicle than on the driver side. On the central section (21) of the barrier (2), the back wall (36) and at least a portion of the second recessed area (23) are disposed in a more rearward position than the housing support (19).

Since, the second recessed area (23) of the central section (21) is open to the forward side (24) of the barrier (2) when the vehicle security partition (1) is installed in an automotive vehicle, the second recessed area (23) is readily accessible from the front seating area. Preferably, disposed within the second recessed area (23) are means for supporting articles. The means for supporting articles may include a gun mount (28), as well as supports for other articles, including flashlights, flares and electronic equipment.

In a preferred embodiment of the present invention, the vehicle security partition (1) is installed directly behind the front seats of an automotive vehicle. For installation, the driver and front passenger seats are moved fully forward. The trim is removed from the driver and passenger side pillars of the vehicle's interior compartment and the passenger side (11) and driver side (12) upper brackets are attached to the respective passenger side pillar and driver side pillar. The passenger (13) and driver (14) side floor brackets are attached to respective front seat bolts on the vehicle floorboard. The frame (3) is placed in the rear seating area of the vehicle with the housing support (19) positioned in back of the front seats. Each of the passenger side member (4) and the driver side member (5) receives a protrusion (30a, 30b) of the respective floor bracket (13, 14) therein to thereby secure the frame (3) to the vehicle's floorboard. Each of the upper brackets (11, 12) is attached to the respective passenger (4) and driver (5) side members to further secure the frame (3) within the vehicle. The passenger side wings (32, 33) and driver side wings (34, 35) are then attached to the frame (3). The passenger side wings (32, 33) are attached to the passenger side member (4) of the frame (3) and the upper section (7) of the barrier (2). The driver side wings (34, 35) are attached to the driver side member (5) of the frame (3) and the upper section (7) of the barrier (2). Next, the bi-directional recessed housing (22) is attached to the housing support (19). Finally, all hardware is checked for proper placement, tightened completely and the partition (1) is inspected for proper function and safety.

Accordingly, the bi-directional recessed housing on the vehicle security partition of the present invention provides first and second recessed areas which organize the space usage in the interior compartment of a vehicle. The first recessed area is open to the rear seating area of a vehicle providing additional leg room behind the front passenger seating area so that a backseat occupant can sit comfortably with his or her feet placed on the floorboard. The second recessed area is open to the forward seating area providing additional storage space accessible to occupants on the forward side of the partition. Furthermore, utilization of the bi-directional recessed housing on the partition allows for the provision of adequate room in the driver seating area of the vehicle to enable full adjustment of the driver seat.

The vehicle security partition of the present invention can be used in smaller model cars without compromising the driver seat adjustment and driver's comfort. In addition, the partition provides legroom in the rear seating area, allowing for the comfort of a rear occupant.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A vehicle security partition for dividing an interior compartment of an automotive vehicle into front and rear seating areas and separating rear seating area occupants from front seating area occupants, said vehicle security partition comprising:
a barrier having forward and rearward sides, wherein said forward side is directed toward said front seating area of the interior compartment and said rearward side is directed toward said rear seating area when installed in the vehicle;
said barrier further comprising a housing;
said housing including a passenger side section and a central section;
said passenger side section comprising a first area having a front wall, wherein said first area opens to the rearward side of the barrier;
said central section comprising a second area having a back wall, wherein said second area opens to the forward side of the barrier; and
wherein said back wall of the second area is generally disposed rearwardly of the front wall of the first area; and
a housing support, wherein said housing support supports said housing within the interior compartment of the vehicle; and
wherein said housing support comprises a driver side support, said driver side support being generally disposed rearwardly of said front wall and forwardly of said back wall and said central section being generally positioned between said passenger side section and said driver side support.

2. The vehicle security partition of claim 1 further comprising a frame for holding the barrier within the vehicle.

3. The vehicle security partition of claim 1 further comprising means for attaching the vehicle security partition to the vehicle.

4. The vehicle security partition of claim 2 further comprising at least one side panel attached to the frame.

5. The vehicle security partition of claim 4, wherein said at least one side panel comprises a passenger side panel and a driver side panel.

6. The vehicle security partition of claim 5, wherein said frame is generally U-shaped and includes a passenger side member, a driver side member and a top cross member that extends between the passenger side member and driver side member;
said passenger side panel is attached to the passenger side member of the frame;
said driver side panel is attached to the driver side member of the frame; and
said passenger and driver side panels extend outwardly from the frame.

7. The vehicle security partition of claim 6, wherein said passenger side panel comprises upper and lower passenger side wings; said driver side panel comprises upper and lower driver side wings; and said side wings extend between the frame and the interior compartment of the vehicle.

8. The vehicle security partition of claim 1 further comprising an upper section generally disposed above said housing support, wherein said upper section comprises an opening having an adjustable cover.

9. A vehicle security partition for dividing an interior compartment of an automotive vehicle into front and rear seating areas, said vehicle security partition comprising:
a barrier having forward and rearward sides; wherein said forward side is generally directed toward the front seating area of the interior compartment and said rearward side is generally directed toward the rear seating area when installed in the vehicle;
said barrier further comprising a bi-directional housing;
said bi-directional housing including a first recessed area and a second recessed area;
said first recessed area having a front wall;
said second recessed area having a back wall;
wherein said first recessed area opens to the rearward side of the barrier and the second recessed area opens to the forward side of the barrier; and
wherein said back wall of the second recessed area is generally disposed rearwardly of the front wall of the first recessed area.

10. The vehicle security partition of claim 9 further comprising a housing support, wherein said housing support supports said bi-directional housing within the interior compartment of the vehicle.

11. The vehicle security partition of claim 10, wherein said housing support comprises a driver side support;
said second recessed area is generally disposed between said first recessed area and said driver side support; and
said driver side support is generally disposed rearwardly of said front wall and forwardly of said back wall.

12. The vehicle security partition of claim 9 further comprising a frame for holding the barrier within the vehicle and means for securing the vehicle security partition to the vehicle.

13. The vehicle security partition of claim 12, wherein said means for securing the vehicle security partition to the vehicle comprises at least one bracket disposed on said frame.

14. The vehicle security partition of claim 9 further comprising a frame for holding the barrier within the vehicle and a plurality of support brackets for securing the partition in the vehicle.

15. A vehicle security partition for an automotive vehicle which divides an interior compartment having a driver side and a passenger side of the vehicle into front and rear seating areas and separates rear seating area occupants from front seating area occupants, said vehicle security partition comprising:
a barrier having forward and rearward sides;
a frame for supporting the barrier; and a plurality of support brackets for securing the vehicle security partition to the vehicle;

wherein said forward side of said barrier is directed toward said front seating area of the interior compartment and said rearward side of said barrier is directed toward said rear seating area when said barrier is installed in the vehicle;

said barrier comprises upper and lower sections;

said upper section of said barrier comprises a window;

said lower section comprises a bi-directional recessed housing;

said bi-directional recessed housing includes a passenger side section, a central section and a shared wall;

wherein said passenger side section is generally disposed on the passenger side of the interior compartment and said central section is generally disposed between the passenger side and the driver side of the interior compartment;

said passenger side section includes a first recessed area;

said central section includes a second recessed area;

said first recessed area comprises a front wall; and said second recessed area comprises a back wall;

wherein said first recessed area opens to the rearward side of the barrier; and said second recessed area opens to the forward side of the barrier; said back wall of the second recessed area is disposed rearwardly of the front wall of the first recessed area; and said shared wall is disposed between the first and second recessed areas.

16. A bi-directional housing for a security partition for a vehicle for dividing an interior compartment of the vehicle into front and rear seating areas, the bi-directional housing comprising:

a forward side and a rearward side;

a first recessed area and a second recessed area;

wherein said first recessed area comprises a front wall;

said second recessed area comprises a back wall;

said first recessed area opens to the rearward side of the housing;

said second recessed area opens to the forward side of the housing; and said back wall of the second recessed area is generally disposed rearwardly of the front wall of the first recessed area.

17. The bi-directional housing of claim 16, further comprising means for attaching the housing to the partition.

18. A bi-directional recessed housing for a vehicle security partition for an automotive vehicle for dividing an interior compartment of the vehicle into front and rear seating areas and providing additional leg room in a passenger side of the rear seating area, the bi-directional recessed housing comprising:

a forward side and a rearward side;

a passenger side section having a first recessed area;

a central section having a second recessed area; and a shared wall;

wherein said shared wall is disposed between the first and second recessed areas;

said first recessed area comprises a front wall;

said second recessed area comprises a back wall;

said first recessed area opens toward said rearward side of the bi-directional housing;

said second recessed area opens toward said forward side of the bi-directional housing;

said shared wall is contiguous with said first and second recessed areas; and said back wall of the second recessed area is disposed rearwardly of the front wall of the first recessed area.

19. The bi-directional recessed housing of claim 18, further comprising means for attaching the housing to the partition.

20. The bi-directional recessed housing of claim 19, wherein said means for attaching the housing to the partition comprises a plurality of fasteners.

21. The bi-directional recessed housing of claim 18, wherein said back wall of said second recessed area comprises means for supporting articles.

22. The bi-directional recessed housing of claim 21, wherein said means for supporting articles includes at least one gun mount.

23. The bi-directional recessed housing of claim 18, wherein said shared wall is generally trapezoidally shaped.

24. The bi-directional recessed housing of claim 23, wherein said first recessed area further comprises a passenger top wall and a passenger side wall;

said second recessed area further comprises a central top wall and a central side wall;

said front wall and said passenger top wall of the first recessed area are generally rectangularly shaped;

said back wall and said central top wall are generally rectangularly shaped; and said shared wall, said central side wall and said passenger side wall are generally trapezoidally shaped.

* * * * *